UNITED STATES PATENT OFFICE.

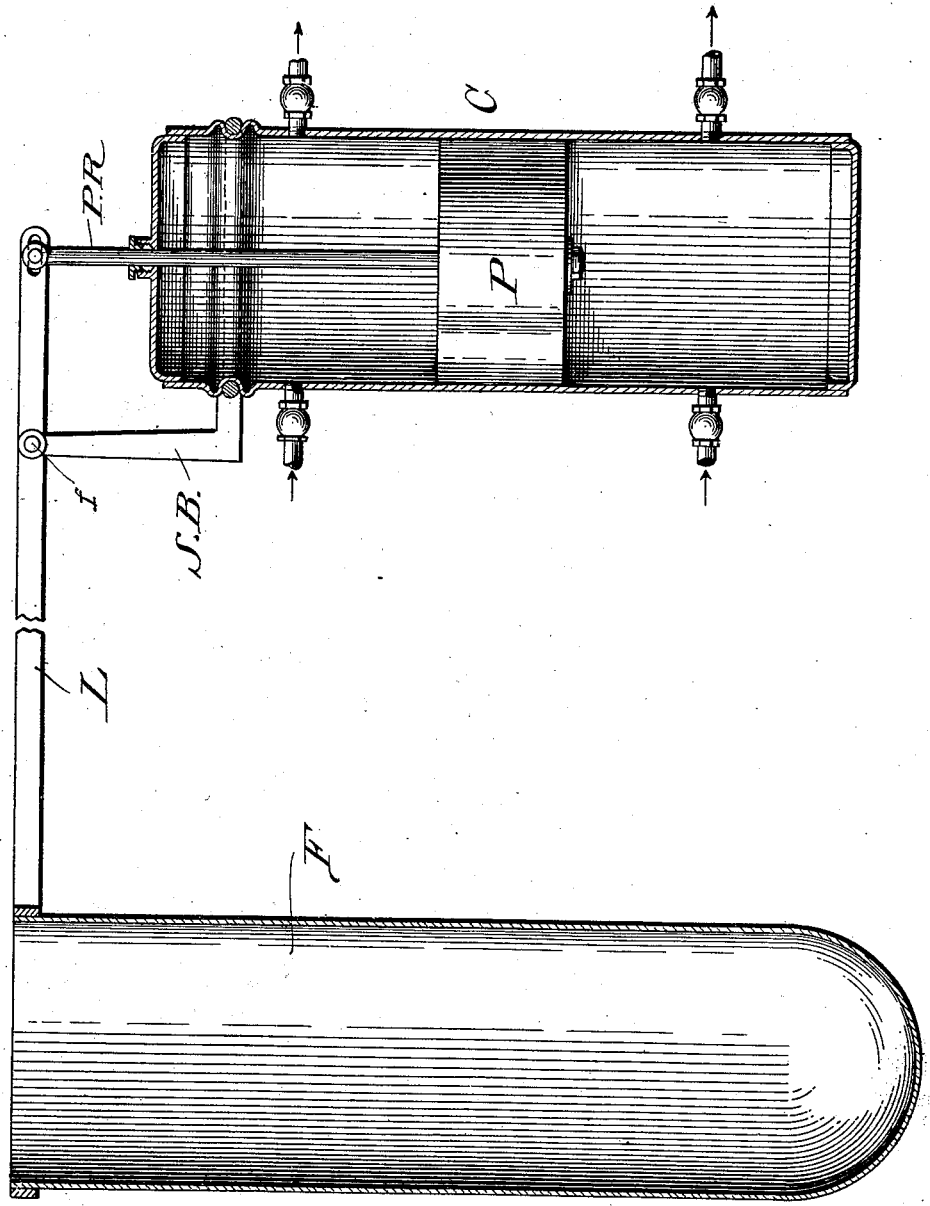

THOMAS McNALLY, OF CORK, OHIO.

PUMP ATTACHMENT.

No. 889,325.  Specification of Letters Patent.  Patented June 2, 1908.

Application filed August 30, 1907. Serial No. 390,746.

*To all whom it may concern:*

Be it known that I, THOMAS McNALLY, a citizen of the United States, residing at Cork, in the county of Ashtabula and State of Ohio, have invented certain new and useful Improvements in Pump Attachments, of which the following is a specification.

My invention relates to wave actuated pumps; and my object in view is to simplify the construction and adapt the device for operation by the waves or surf from whatever direction it may come.

The accompanying drawing illustrates one mode of constructing and applying my invention.

Therein, C represents a cylinder of any suitable dimensions, and fixed, preferably at a point where its outwardly extending connections may be radially directed to a number of points of the compass so that by adjusting them upon the cylinder, they may be actuated by the waves or surf running towards them from as many different directions.

The cylinder is in communication with the supply water by valves admitting water to it both above and below the piston P, as indicated by the arrows and is in communication with a water storage reservoir (not shown) by exit valves as indicated also by arrows. The piston is provided with a rod extending through the top cylinder head and there connected to the short arm of a long lever L, which is fulcrumed at $f$ upon brace or post S, B swiveled upon the cylinder. To the outer end of the long arm of the lever L is attached the float F, which is acted upon by the waves or tides floating the same up or down. The swivel connection of the fulcrum post admits of its adjustment radially around the cylinder so that the float may be best exposed to the waves from whatever direction they may be running.

In operation, a wave flowing beneath and around the float raises it, thereby depressing the piston and forcing water in the cylinder below it, out through the discharge valve to the reservoir, and at the same time, sucking in water above the piston through the inlet valve. As the wave recedes, the float drops, so drawing the piston up and forcing the water in the cylinder above the piston out through the discharge to the reservoir and at the same time sucking in water below the piston through the inlet valve. This action is repeated with the passage of each wave under and past the float.

What I claim as new and desire to cover by Letters Patent is:

The combination of the fixed cylinder provided with piston, rod, and valves, the fulcrum brace or post swiveled upon said cylinder, the lever fulcrumed upon said post and the float attached to said lever, as set forth.

In testimony whereof I affix my signature in presence of two witnesses.

THOMAS McNALLY. [L. S.]

Witnesses:
W. N. WOODSON,
C. E. PHILLIPS.